US009014650B2

(12) United States Patent
Kwak

(10) Patent No.: US 9,014,650 B2
(45) Date of Patent: *Apr. 21, 2015

(54) RECEIVED SIGNAL TO NOISE INDICATOR

(71) Applicant: Intel Corporation, Santa Clara, CA (US)

(72) Inventor: Joseph A. Kwak, Hawkesbury, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,123

(22) Filed: Aug. 16, 2013

(65) Prior Publication Data

US 2013/0329590 A1    Dec. 12, 2013

Related U.S. Application Data

(63) Continuation of application No. 13/371,582, filed on Feb. 13, 2012, now Pat. No. 8,543,075, which is a continuation of application No. 12/814,690, filed on Jun. 14, 2010, now Pat. No. 8,116,692, which is a (Continued)

(51) Int. Cl.
 *H04B 17/00*    (2006.01)
 *H04W 24/10*    (2009.01)

(Continued)

(52) U.S. Cl.
 CPC ............. *H04W 24/10* (2013.01); *H04L 1/0045* (2013.01); *H04L 1/20* (2013.01); *H04L 1/206* (2013.01)

(58) Field of Classification Search
 CPC . H04L 1/0045; H04W 24/10; H04B 17/0042; H04B 17/0057; H04B 17/006; H04B 17/0067; H04B 17/007

USPC .................. 455/67.1, 67.7, 226.1–226.43
See application file for complete search history.

(56) References Cited

U.S. PATENT DOCUMENTS

| 4,542,514 A | 9/1985 | Watanabe |
| 5,143,117 A | 9/1992 | Klein |

(Continued)

FOREIGN PATENT DOCUMENTS

| WO | 01/08323 | 2/2001 |
| WO | 01/20789 | 3/2001 |

(Continued)

OTHER PUBLICATIONS

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications." ANSI/IEEE Std 802.11, 1999 Edition (Reaffirmed Jun. 12, 2003).

(Continued)

*Primary Examiner* — Simon Nguyen
(74) *Attorney, Agent, or Firm* — Blakely, Sokoloff, Taylor & Zafman LLP

(57) ABSTRACT

A method and device may be used to produce a received interference value in wireless communications. The device may include one or more components to measure a received power of a channel and measure an average noise plus interference power of the channel. The device may include a processor configured to calculate a received signal to noise indicator (RSNI) value. The RSNI may be based on the measured received power and the measured average noise plus interference power.

18 Claims, 8 Drawing Sheets

A: RF POWER, RF S/N+I FROM EACH AP

B: BB S/N+I FROM EACH AP, (BB POWER MAINTAINED CONSTANT BY AGC)

C & D: BIT ERROR RATE (BER) @ EACH DATA RATE

E: FRAME ERROR RATE (FER) @ EACH DATA RATE

Related U.S. Application Data continuation of application No. 11/328,994, filed on Jan. 10, 2006, now Pat. No. 7,738,848, which is a continuation-in-part of application No. 10/729,332, filed on Dec. 5, 2003, now abandoned.

(60) Provisional application No. 60/440,073, filed on Jan. 14, 2003.

(51) Int. Cl.
*H04L 1/00* (2006.01)
*H04L 1/20* (2006.01)

(56) References Cited

U.S. PATENT DOCUMENTS

| | | |
|---|---|---|
| 5,214,687 A | 5/1993 | Kaensaekoski et al. |
| 5,440,582 A | 8/1995 | Birchler et al. |
| 5,809,059 A | 9/1998 | Souissi et al. |
| 5,909,465 A | 6/1999 | Bottomley et al. |
| 5,963,583 A | 10/1999 | Davidovici et al. |
| 6,028,894 A * | 2/2000 | Oishi et al. .................. 375/227 |
| 6,034,952 A * | 3/2000 | Dohi et al. .................. 370/335 |
| 6,108,374 A | 8/2000 | Balachandran et al. |
| 6,118,806 A | 9/2000 | Niida et al. |
| 6,154,450 A | 11/2000 | Wallentin et al. |
| 6,167,273 A | 12/2000 | Mandyam |
| 6,185,432 B1 | 2/2001 | Vembu |
| 6,201,954 B1 | 3/2001 | Soliman |
| 6,229,848 B1 | 5/2001 | Tanaka |
| 6,292,519 B1 * | 9/2001 | Popovic .................. 375/346 |
| 6,298,242 B1 | 10/2001 | Schiff |
| 6,426,971 B1 | 7/2002 | Wu et al. |
| 6,430,237 B1 | 8/2002 | Anvari |
| 6,449,463 B1 | 9/2002 | Schiff |
| 6,456,652 B1 | 9/2002 | Kim et al. |
| 6,456,964 B2 | 9/2002 | Manjunath et al. |
| 6,535,733 B1 | 3/2003 | Matusevich et al. |
| 6,563,460 B2 | 5/2003 | Stilp et al. |
| 6,571,104 B1 | 5/2003 | Nanda et al. |
| 6,587,696 B1 | 7/2003 | Ma et al. |
| 6,600,933 B1 * | 7/2003 | Hiramatsu et al. ............. 455/561 |
| 6,654,613 B1 | 11/2003 | Maeng et al. |
| 6,675,012 B2 | 1/2004 | Gray |
| 6,690,944 B1 | 2/2004 | Lee et al. |
| 6,754,506 B2 | 6/2004 | Chang et al. |
| 6,791,954 B1 | 9/2004 | Cheng et al. |
| 6,810,273 B1 | 10/2004 | Mattila et al. |
| 6,826,140 B2 | 11/2004 | Brommer et al. |
| 6,847,809 B2 | 1/2005 | Gurelli et al. |
| 6,850,736 B2 | 2/2005 | McCune, Jr. |
| 6,853,839 B2 | 2/2005 | Usuda et al. |
| 6,871,066 B1 | 3/2005 | Khullar et al. |
| 6,987,738 B2 | 1/2006 | Subramanian et al. |
| 7,012,978 B2 | 3/2006 | Talwar |
| 7,039,412 B2 | 5/2006 | Sandhu et al. |
| 7,187,646 B2 * | 3/2007 | Schramm .................. 370/206 |
| 7,254,496 B2 | 8/2007 | Shin et al. |
| 7,298,802 B2 | 11/2007 | Ren et al. |
| 7,738,848 B2 | 6/2010 | Kwak |
| 2002/0018453 A1 | 2/2002 | Yu et al. |
| 2002/0060995 A1 | 5/2002 | Cervello et al. |
| 2002/0102944 A1 | 8/2002 | Haim |
| 2002/0136287 A1 | 9/2002 | Heath et al. |
| 2002/0151290 A1 | 10/2002 | Chen |
| 2002/0159514 A1 | 10/2002 | Miyoshi et al. |
| 2002/0172186 A1 | 11/2002 | Larsson |
| 2002/0174242 A1 | 11/2002 | Hindie et al. |
| 2002/0183028 A1 | 12/2002 | Takahashi et al. |
| 2002/0188723 A1 | 12/2002 | Choi et al. |
| 2003/0022645 A1 | 1/2003 | Runzo |
| 2003/0045243 A1 | 3/2003 | Rauhala |
| 2003/0097623 A1 | 5/2003 | Razavilar et al. |
| 2003/0153277 A1 | 8/2003 | Ito et al. |
| 2003/0223354 A1 | 12/2003 | Olszewski |
| 2004/0022228 A1 | 2/2004 | Tyra et al. |
| 2004/0093178 A1 * | 5/2004 | Shin et al. .................. 702/69 |
| 2004/0100898 A1 | 5/2004 | Anim-Appiah et al. |
| 2004/0198404 A1 | 10/2004 | Attar et al. |
| 2004/0203403 A1 | 10/2004 | Cutcher et al. |
| 2004/0203474 A1 | 10/2004 | Miller et al. |
| 2005/0069026 A1 | 3/2005 | Vepsalainen et al. |
| 2005/0143117 A1 | 6/2005 | Jalloul et al. |
| 2005/0152480 A1 | 7/2005 | Chang et al. |
| 2005/0169301 A1 | 8/2005 | Jain et al. |
| 2006/0154633 A1 | 7/2006 | Wang |
| 2006/0194552 A1 | 8/2006 | Jin et al. |
| 2007/0201538 A1 | 8/2007 | Wang et al. |

FOREIGN PATENT DOCUMENTS

| | | |
|---|---|---|
| WO | 01/95521 | 12/2001 |
| WO | 02/35730 | 5/2002 |
| WO | 03/021845 | 2/2003 |
| WO | 2004/080106 | 9/2004 |
| WO | 2004/100468 | 11/2004 |

OTHER PUBLICATIONS

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0, Nov. 2002.

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0.1, Mar. 2003.

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0.2, May 2003.

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0.3, Jul. 2003.

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0.4, Jul. 2003.

"Draft Supplement to Standard for Telecommunications and Information Exchange Between Systems—LAN/MAN Specific Requirements—Part 1: Wireless LAN Medium Access Control (MAC) and Physical Layer (PHY) Specifications: Specification for Radio Resource Measurement." IEEE Std 802.11k/D0.9, Nov. 2003.

"Draft Supplement to Standard for Telecommunications and Information Exchange Between Systems—LAN/MAN Specific Requirements—Part 11: Wireless LAN Medium Access Control (MAC) and Physical Layer (PHY) Specifications: Specification for Radio Resource Measurement." IEEE Std 802.11k/D0.10, Nov. 2003.

"Draft—Recommended Practice for Multi-Vendor Access Point Interoperability Via an Inter-Access Point Protocol Across Distribution Systems Supporting IEEE 802.11 Operation." IEEE Std 802.11f/D3.1, Apr. 2002.

Paine, Richard H. et al. "Unapproved Draft—IEEE 802.11 Radio Resource Measurement Issues—IEEE 802.11-02/508r10." Oct. 19, 2002.

Paine, Richard H. "Unapproved Draft—IEEE 802.11 Radio Resource Measurement Issues—IEEE 802.11-03/134r0." Jan. 16, 2003.

Moreton, Mike. "Comment Resolution Motions—IEEE 802.11-03/169rl." IEEE Std. 802-11 Submission. Mar. 2003.

Lampe, Mattias et al. "PER-Prediction for Link Adaptation in OFDM Systems." Technical University of Hamburg-Harburg, Sep. 10, 2002.

(56) References Cited

OTHER PUBLICATIONS

Non-Final Office Action for U.S. Appl. No. 10/729,332 mailed Jun. 1, 2005, 10 pages.
Non-Final Office Action for U.S. Appl. No. 10/729,332 mailed Aug. 7, 2006, 6 pages.
Non-Final Office Action for U.S. Appl. No. 10/729,332 mailed Mar. 30, 2007, 6 pages.
Non-Final Office Action for U.S. Appl. No. 10/729,332 mailed Jul. 2, 2008, 7 pages.
Final Office Action for U.S. Appl. No. 10/729,332 mailed Feb. 14, 2006, 4 pages.
Notice of Allowance for U.S. Appl. No. 10/729,332 mailed Oct. 9, 2007, 6 pages.
Notice of Allowance for U.S. Appl. No. 10/729,332 mailed Apr. 14, 2008, 7 pages.
Non-Final Office Action for U.S. Appl. No. 11/328,994 mailed Jan. 12, 2009, 9 pages.
Supplemental Notice of Allowability for U.S. Appl. No. 11/328,994 mailed May 12, 2010, 5 pages.
Notice of Allowance for U.S. Appl. No. 11/328,994 mailed Dec. 16, 2009, 7 pages.
Notice of Allowability for U.S. Appl. No. 11/328,994 mailed Nov. 5, 2009, 4 pages.
Notice of Allowance for U.S. Appl. No. 11/328,994 mailed Aug. 26, 2009, 7 pages.
Ex Parte Quayle Action for U.S. Appl. No. 12/814,690 mailed Jul. 1, 2011, 5 pages.
Notice of Allowance for U.S. Appl. No. 12/814,690 mailed Oct. 18, 2011, 7 pages.
Non-Final Office Action for U.S. Appl. No. 13/371,582 mailed May 1, 2012, 8 pages.
Final Office Action for U.S. Appl. No. 13/371,582 mailed Oct. 26, 2012, 9 pages.
Notice of Allowance for U.S. Appl. No. 13/371,582 mailed May 23, 2013, 9 pages.
International Search Report and Written Opinion for PCT/US2004/000526 mailed Jun. 14, 2005, 6 pages.
International Preliminary Examination Report for PCT/US2004/000526 mailed Oct. 27, 2005, 5 pages.
First Examination Report for Indian Patent Application No. 3067/DELNP/2005 mailed Dec. 31, 2010, 2 pages.

* cited by examiner

A: RF POWER, RF S/N+I FROM EACH AP

B: BB S/N+I FROM EACH AP, (BB POWER MAINTAINED CONSTANT BY AGC)

C & D: BIT ERROR RATE (BER) @ EACH DATA RATE

E: FRAME ERROR RATE (FER) @ EACH DATA RATE

| DATA RATE (Mbits/s) | MODE | FEC RATE | PPDU LENGTH (bytes) | FER | PSNI |
|---|---|---|---|---|---|
| 1 | DSSS | no FEC | 125 | 10% +/-0.2% | 24 +/- 10 |
| 2 | DSSS | no FEC | 1250 | 10% +/-0.2% | 49 +/- 10 |
| 5.5 | HRDSSS | no FEC | 1250 | 10% +/-0.2% | 76 +/- 10 |
| 5.5 | HRDSSS | 1/2 | 1250 | 10% +/-0.2% | 44 +/- 10 |
| 6 | OFDM | 1/2 | 1250 | 10% +/-0.2% | 46 +/- 10 |
| 9 | OFDM | 3/4 | 1250 | 10% +/-0.2% | 62 +/- 10 |
| 11 | HRDSSS | no FEC | 1250 | 10% +/-0.2% | 94 +/- 10 |
| 11 | HRDSSS | 1/2 | 1250 | 10% +/-0.2% | 62 +/- 10 |
| 12 | OFDM | 1/2 | 1250 | 10% +/-0.2% | 64 +/- 10 |
| 18 | OFDM | 3/4 | 1250 | 10% +/-0.2% | 80 +/- 10 |
| 24 | OFDM | 1/2 | 1250 | 10% +/-0.2% | 106 +/- 10 |
| 36 | OFDM | 3/4 | 1250 | 10% +/-0.2% | 122 +/- 10 |
| 48 | OFDM | 2/3 | 1250 | 10% +/-0.2% | 155 +/- 10 |
| 54 | OFDM | 3/4 | 1250 | 10% +/-0.2% | 160 +/- 10 |

*FIG. 3*

RECEIVED SIGNAL TO NOISE INDICATOR

CROSS REFERENCE TO RELATED APPLICATIONS

This application is a continuation of U.S. patent application Ser. No. 13/371,582, filed on Feb. 13, 2012, which is a continuation of U.S. patent application Ser. No. 12/814,690, filed on Jun. 14, 2010, which issued on Feb. 14, 2012 as U.S. Pat. No. 8,116,692, which is a continuation of U.S. patent application Ser. No. 11/328,994, filed on Jan. 10, 2006, which issued on Jun. 15, 2010 as U.S. Pat. No. 7,738,848, which is a continuation-in-part of U.S. patent application Ser. No. 10/729,332, filed on Dec. 5, 2003, which claims priority from U.S. Provisional Application No. 60/440,073, filed on Jan. 14, 2003, which are hereby incorporated by reference.

TECHNOLOGY FIELD

This application relates generally to wireless communications. In particular, the application relates to measurements with respect to such communications.

BACKGROUND

This specification includes the following acronyms:
AP access point
BER bit error rate
CCK complementary code keying (RF modulation)
DSSS direct sequence spread spectrum
EIRP equivalent isotropically radiated power
ERP effective radiated power
FEC forward error correction
FER frame error rate
MIB management information base
OFDM orthogonal frequency division multiplexing
PBCC packet binary convolution coding
PHY physical layer
PLCP physical layer conversion protocol
PMD physical medium dependent
PPDU PLCP protocol data unit
PSK phase shift keying
PSNI perceived signal to noise indication
RPI received power indicator
RSSI received signal strength indicator
SQ signal quality
STA station The current IEEE standard 802.11 is entrusted with the task of providing interfaces, measurements, and mechanisms to support higher layer functions for efficient network management. Presently, the 802.11 standard has defined several physical parameters, none of which is completely suitable for network management purposes. One example of a measurable parameter is received signal strength indicator (RSSI), which is a reportable parameter for each received frame but is not quantified in the standards, and is not fully specified. The standards do include certain definitions in the context of RSSI, but it remains that RSSI poses certain limitations for use in network management since RSSI parameters from different stations (STAs) may not be uniformly defined and thus are not comparable.

A second suggested measurable parameter is the signal quality (SQ), which also happens to be an unquantized indicator of code synchronization, but is only applicable to the DSSS PHY modulation and is not applicable to OFDM PHY modulations. Yet another measurable parameter is the RPI histogram, which, even though quantized and specified, cannot make target measurements on any AP. RPI histograms measure channel power from all sources including the 802.11 sources, radars, and all other interference sources, which is not helpful for relying on the RPI histogram as a controlling parameter.

Current standards define received signal strength indication based mainly on measurement of AP signals:
(1) on the same channel, same physical layer, and same station; and
(2) on different channels, same physical layer, and same station.

Significantly, measurements involving different physical layers and the same or different stations, even though required, are not presently addressed in the standards.

Network management needs comparative PHY measurements for use in handoff decisions, for example. The following types of comparative PHY measurements are made.
1. To compare AP signals on the same channel, the same PHY, in the same STA.
2. To compare AP signals on the same channel, the same PHY, in different STAs.
3. To compare AP signals on different channels, the same PHY, in the same STA.
4. To compare AP signals on different channels, the same PHY, in different STAs.
5. To compare AP signals on different PHYs in different STAs.
6. To compare AP signals on different PHYs in the same STA. Comparative measurements are crucial to handoff decisions for Network Management.

RSSI, as currently defined, only addresses categories (1) and (3) above. The RSSI is a measure of the RF energy received by the DSSS PHY or the OFDM PHY. RSSI indications of up to eight bits (256 levels) are supported. The allowed values for RSSI range from 0 through RSSI maximum. This parameter is a measure by the PHY sublayers of the energy observed at the antenna used to receive the current PPDU. RSSI is measured during the reception of the PLCP preamble. RSSI is intended to be used in a relative manner, and it is a monotonically increasing function of the received power.

CCK, ER-PBCC: the 8-bit value of RSSI as described in 18.4.5.11.

ERP-OFDM, DSSS-OFDM, the 8 bit value is in the range of 0 to RSSI maximum as described in 17.2.3.2.

Some limitations of the RSSI indicator are: RSSI is a monotonic, relative indicator of power at the antenna connector, which indicates sum of desired signal, noise, and interference powers. In high interference environments, RSSI is not an adequate indicator of desired signal quality. RSSI is not fully specified: there are no unit definitions and no performance requirements (accuracy, fidelity, testability). Since so little about RSSI is specified, it must be assumed that widely variant implementations already exist. It is not possible to compare RSSIs from different products and perhaps not even from different channels/bands within the same product.

Although RSSI has limited use for evaluating AP options within a given PHY, it is not useful in comparing different PHYs. RSSI must be rescaled for DSSS and OFDM PHYs. RSSI is clearly not useable by network management for load balancing or load shifting and RSSI from one STA does not relate to RSSI from any other STA.

SUMMARY

A method and device may be used to produce a received interference value in wireless communications. The device may include one or more components to measure a received power of a channel and measure an average noise plus interference power of the channel. The device may include a processor configured to calculate a received signal to noise indicator (RSNI) value. The RSNI may be based on the measured received power and the measured average noise plus interference power.

BRIEF DESCRIPTION OF THE DRAWINGS

A more detailed understanding of the invention may be had from the following description of preferred embodiments, given by way of example and to be understood in conjunction with the accompanying drawings wherein:

FIG. 3 shows example PSNI specification points.

DETAILED DESCRIPTION OF THE PREFERRED EMBODIMENTS

Figure 1:
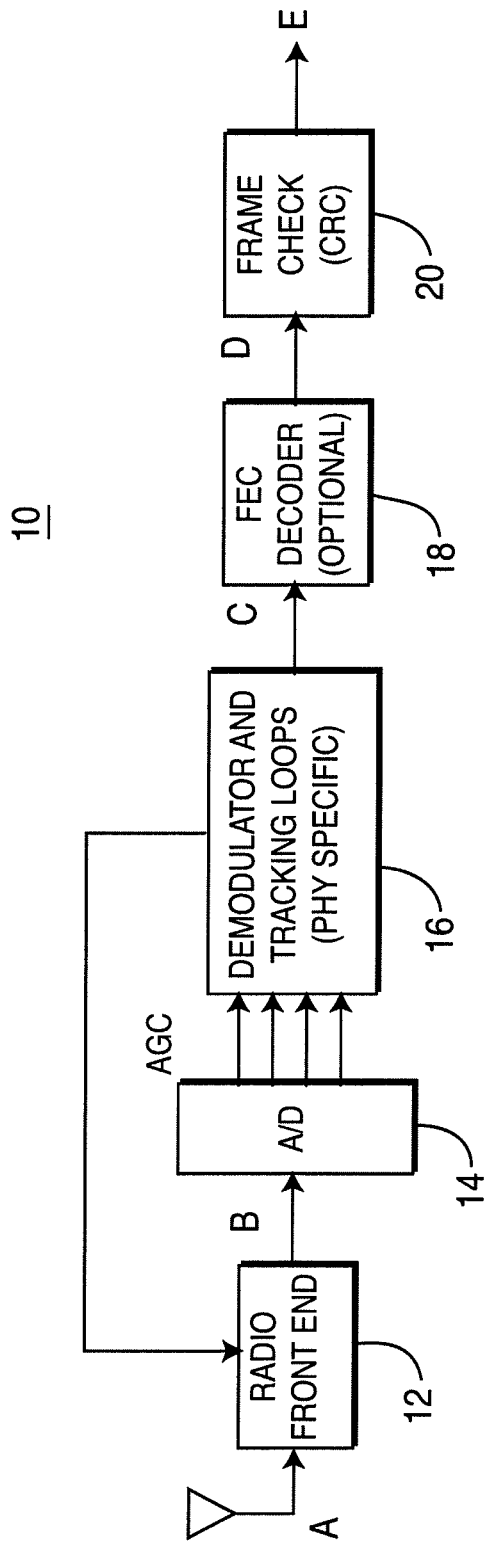
FIG. 1 shows the options for PHY measurements.

It is desirable to provide a method of network management, considering comparative measurements of AP signals in all varying situations including different physical layers and the same or different stations.

Described hereinafter is a demodulator-specific, subjective estimator of perceived S/(N+I) specified by means of a quantized FER indication. The following is noted in the context of the description of the exemplary embodiment.

All digital demodulators use tracking loops and complex post-processing to demodulate received symbols. Many internal demodulator parameters are proportional to perceived S/(N+I). Some examples are:

PSK: baseband phase jitter, base band Error Vector Magnitude (EVM)

DSSS: spreading code correlation quality

OFDM: frequency tracking and channel tracking stability

Demodulator internal parameters are available on a frame-by-frame basis. Demodulator parameters proportional to analog S/(N+I) are invariant with respect to data rates. The same parameter may be used at any data rate.

Demodulator internal parameters may be specified and calibrated in a controlled environment with respect to actual FER performance at two or more operating points defined by rate, modulation, and FEC. Such demodulator internal parameters estimate FER performance in both interference environments and interference-free (noise only) environments and may be used as the basis for PSNI. For PSNI to be a useful indicator it is not necessary to specify which demodulator internal parameter to use as the basis for the indicator, but it is sufficient to only specify how the quantized indicator relates to FER.

The following features are to be noted in connection with the inventive use of PSNI for network management:

PSNI is specified like RSSI as an 8-bit unsigned value, monotonically increasing with increasing S/(N+I).

PSNI is logarithmically scaled to perceived S/(N+I). PSNI is based on a demodulator internal parameter which provides a fast estimator for FER.

Specify PSNI output indication across a range defined by two signal quality points: first point at a minimum useable signal quality level, second point at a maximum signal quality level.

Specify the output value and accuracy of the output value for at least two FER points, and at least one FER point for each valid modulation, FEC, and data rate combination.

PSNI range may span the lower 40 db portion of the operating range of S/(N+I) to cover high FERs at data rates from 1 to 54 Mbps, but higher or lower range spans may be used.

The PSNI indicator is a measure of the perceived, post-processing signal-to-noise-plus-interference (S/(N+I)) ratio in the demodulator. The allowed values for the Perceived Signal to Noise Indicator (PSNI) parameter are in the range from 0 through 255 (i.e., eight binary bits). This parameter is a measure by the PHY sublayer of the perceived signal quality observed after RF downconversion, and is derived from internal digital signal processing parameters of a demodulator used to receive the current frame. PSNI is measured over the PLCP preamble and over the entire received frame. PSNI is intended to be used in a relative manner, and it is a monotonically increasing, logarithmic function of the observed S/(N+I). PSNI accuracy and range are specified at a minimum of two different FER operating conditions. FIG. 3 supplies example specification points for a PSNI scaled to a 43 dB range.

FIG. 1 shows the options for PHY measurements, which can be used for a PSNI indicator. Referring to the receiver 10 in FIG. 1, the following general comments are valid for a wide range of modern modulation and coding techniques. The signal to noise ratio at points A and B are nominally the same and may differ slightly due to added losses in the radio front end 12. The signal to noise ratio after the analog to digital conversion at A/D converter 14 is also nominally the same value, with minor additions to the noise associated with quantization error.

Therefore, in a high performance system, there is only a minor difference between the signal to noise ratio at point A and that at the input to demodulator 16 and tracking loops. In a low complexity and low performance system, the signal to noise ratio difference between point A and the input to demodulator 16 may be significant. The signal to noise ratio at the output of demodulator 16 (point C) is only indirectly observable by means of the bit error rate (BER). The BER at point C relates to the signal to noise ratio at point B according to a theoretical demodulation performance curve which is adjusted to account for actual demodulator implementation losses.

Similarly, the BER at the output of FEC decoder 18 (point D) relates to the FEC decoder input according to a theoretical FEC decoder performance curve which is adjusted to account for actual FEC decoder implementation losses. The frame error rate (FER) at point E at the output of the frame check function 20 is a direct mathematical function of the BER and the error distribution statistics at point D. There are normally no implementation losses associated with the frame check. In general, for low BERs, the FER is equal to the BER multiplied by the frame size in bits.

Figure 1A:
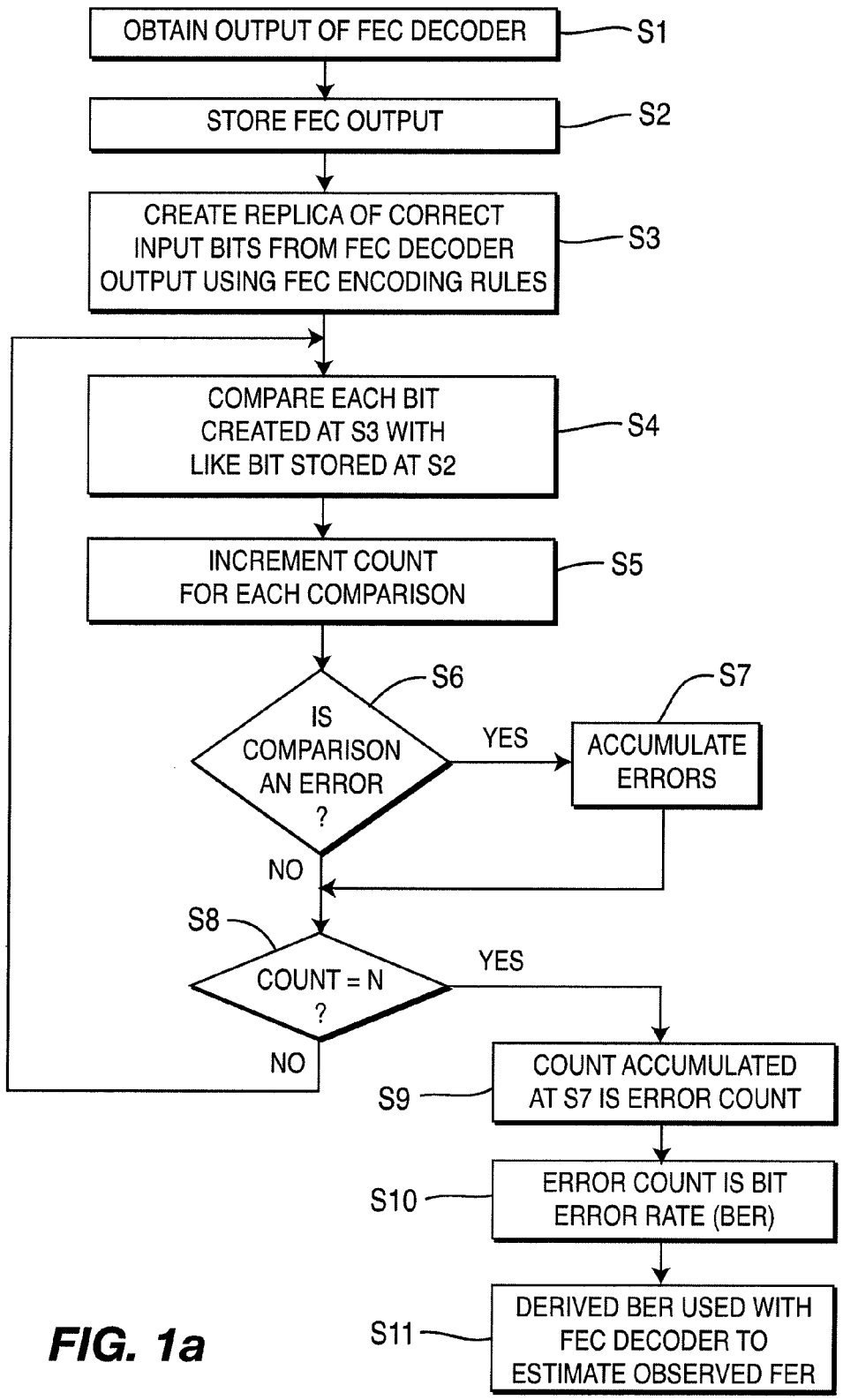
FIG. 1a is a flow diagram showing a technique for deriving an input to the FEC decoder.

The frame check function 20 of receiver 10 in FIG. 1 may be implemented with or without a frame parity check. In most practical designs, each frame contains a parity check, which indicates (with high reliability) whether the block was received correctly or not. The most common parity check is a cyclic redundancy check (CRC), but other techniques are possible and acceptable. If no frame parity check is used, the FER may be estimated using a derived BER from the functioning of the FEC decoder 18. Deriving the BER input from the FEC decoder 18 may be obtained using a well known process, summarized as follows (see FIG. 1a):

The output of the FEC decoder is generally correct. Therefore, this output is obtained and stored (steps S1 and S2). The FEC encoding rules are used to create a replica of the correct input bits (step S3) and each bit is compared to the corresponding bit that was actually input to the FEC decoder and stored (step S4). A count is increased for each comparison (step S5). Each disagreement (step S6) represents an input bit error (step S7) which is accumulated. This derived BER (steps S9, S10) may then be used with the actual performance curve of the FEC decoder to estimate observed FER (step S11). The comparisons (error or no error—step S6) are continued until a count N is reached (step S8), at which time the count at step S7 is identified as the BER (step S9).

In this way, using the actual implementation losses with the theoretical performance curves allows one to relate the signal to noise measurements at any point to the signal to noise measurement at any other point.

From a network management point of view, the signal quality delivered to the user is best represented by the actual FER or observed FER (point E). The PSNI concept provides an indicator which directly relates to observed FER for all STAs, regardless of each STA's different implementation loss. This is accomplished by 1) basing the PSNI on the measurement of an internal demodulator parameter, 2) specifying the PSNI indicator values with respect to observed FER at particular data rate/demodulation/FEC combination points, and 3) adjusting the internal demodulator parameter measurement to account for actual FEC decoder losses which occur downstream from the measurement point. By using a measurement point internal to the demodulator, the measured signal quality already includes the effects of the STA front end losses. By specifying the PSNI indicator with respect to observed FER, actual demodulator losses are included. By adjusting the demodulator measurement to account for actual FEC decoder losses, the validity of the indicator is preserved for all FEC decoders which the STA may use.

Since PSNI is based on an internal demodulator parameter, it can be measured and reported on a frame-by-frame basis. BER or FER measurements at points C or E require thousands of frames for accurate measurement. Therefore PSNI is a practical, fast, and available indictor of observed signal quality.

Measurements of analog signal to noise at points A or B can be performed quickly, yet without also knowing the sum of all the implementation losses further downstream, they cannot be accurately related to observed FER at point E.

In these ways, the inventive use of PSNI for network management is more practical to implement, faster to measure, requires no knowledge of STA implementation, and is thus an improvement over the alternatives discussed here.

Figure 2:
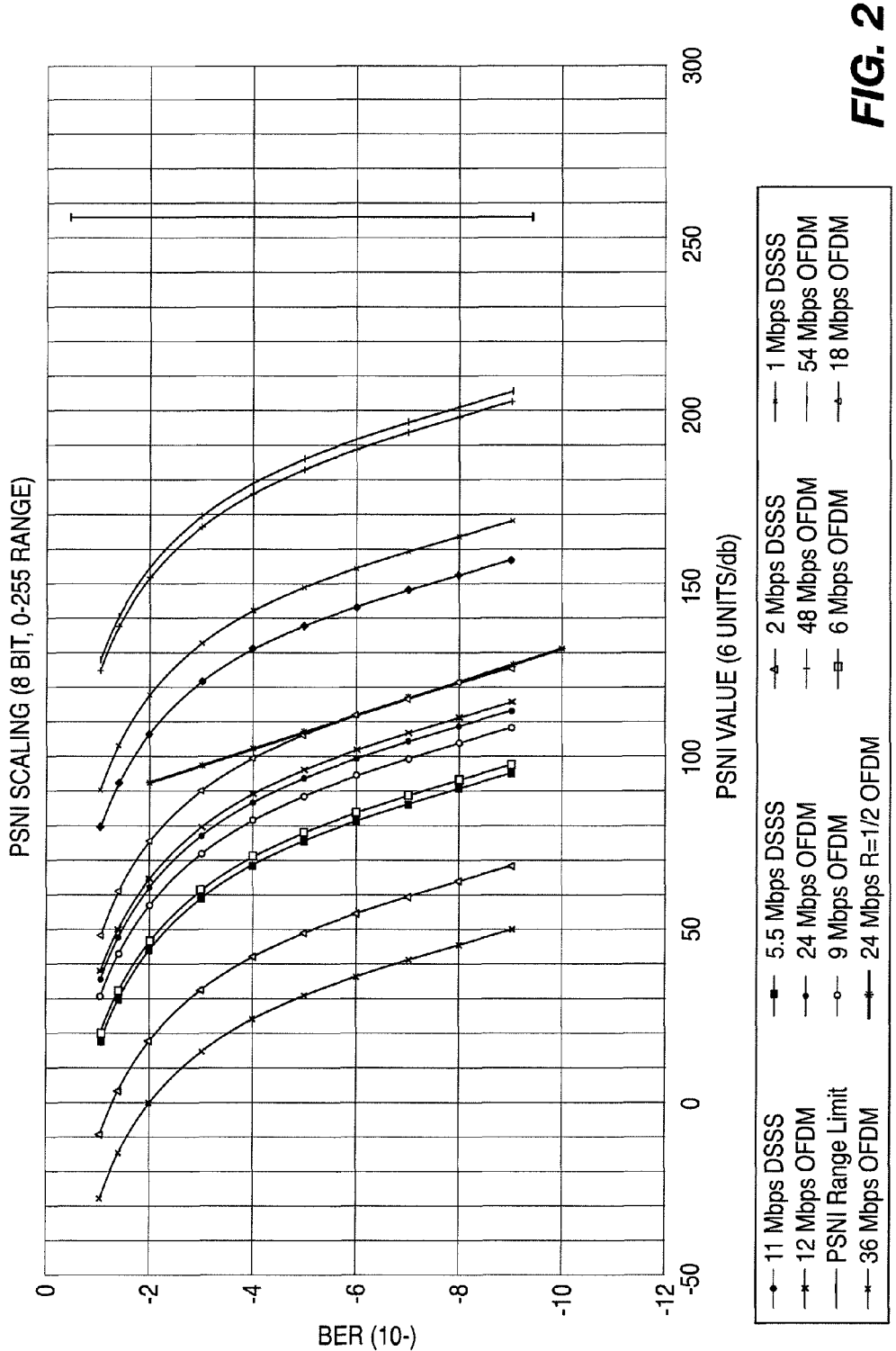
FIG. 2 shows PSNI specified on BER curves.

FIG. 2 shows PSNI specified on BER curves in the context of the invention. FIG. 3 illustrates example specification points for a PSNI scaled to a 43 dB range.

The advantages of PSNI over RSSI include the following: The definition of PSNI meets the requirements for RSSI in that the PSNI is an 8-bit unsigned value (for DSSS PHYs) and is proportional to received signal power. PSNI may be reported in any data field calling for RSSI, which makes the PSNI indicator broadly applicable as an interlayer frame quality measurement. PSNI MIB entries and reporting/posting may further be mandated in 802.11 to make the PSNI improvements available to higher layers.

The foregoing is a description of an exemplary embodiment of the PSNI indicator and method of network management. It is envisaged that the invention is applicable to all modes of transmission including TDD, FDD, CDMA, and other modes without exception. It is also conceivable that variations of the described PSNI indicator and method with suitable modifications are conceivable. All such modifications and variations are envisaged to be within the purview of the invention.

Figure 4:
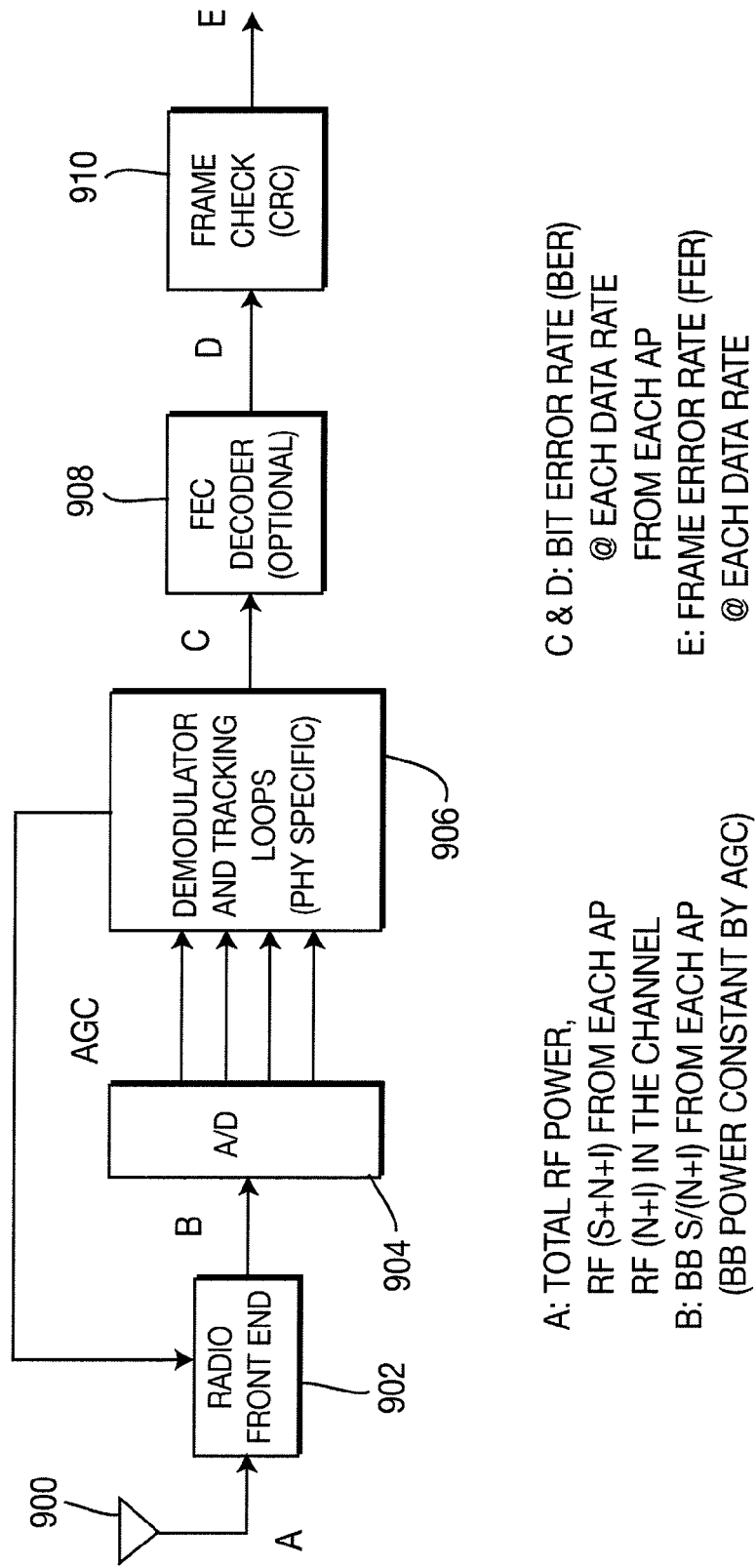
FIG. 4 is a simplified block diagram of physical layer processing in a receiver.

FIG. 4 is a simplified block diagram of physical layer processing in a receiver. The receiver can be in a wireless transmit/receive unit (WTRU) or a base station. In the exemplary embodiment, the receiver is used in an IEEE 802 environment station, such as 802.11a, b, g or n station. The following description is in the context of the exemplary embodiment. However, in other embodiments, the receiver can apply to other wireless standards and to other receivers, such as in an access point or converged technology device.

In FIG. 4, an antenna 900 receives a total radio frequency (RF) power. As illustrated at the antenna connector at point A, the total RF power is a combination of the signal (S)+noise (N)+interference (I) from each access point (AP) and the N+I from each channel. A radio front end 902 processes this received signal and produces a baseband (BB) signal at point B. The quality of this signal can be represented as S/(N+I). The baseband signal is converted from analog to digital by an analog to digital converter (A/D). A demodulator and tracking loops 906 demodulates the digital signal producing a demodulated signal. The configuration of the demodulator and tracking loops 906 is based on the specific physical layer protocol being used. Typically, the demodulator and tracking loops 906 feedback gain values to the radio front end 902 to control a gain of the automatic gain control.

At point C, the quality of the output of the demodulator and tracking loops 906 can be measured as a bit error rate (BER) at each data rate from each AP. For some physical layer implementations, a forward error correction (FEC) decoder 908 is used. At point D, the quality of the output of the FEC 908 can be measured by the BER as well. A frame check device 910 checks each frame of data for errors, such as by using a circular redundancy check (CRC). A quality at the output of the frame check device 910 can be measured as the frame error rate (FER) at each data rate from each access point.

Figure 5:
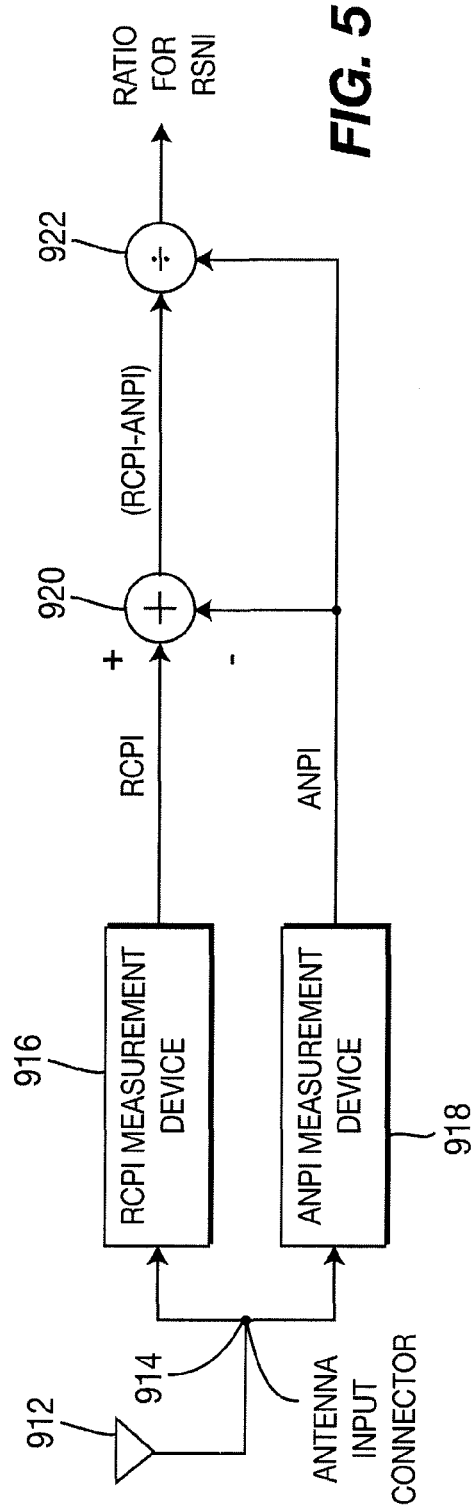
FIG. 5 is a simplified block diagram of an embodiment for measuring a signal to noise indicator, such as a received signal to noise indicator (RSNI).

FIG. 5 is a simplified block diagram of an embodiment for measuring a signal to noise indicator, such as a received signal to noise indicator (RSNI). An antenna 912 receives the total RF power. At the antenna connector 914, a received channel power measurement device 916 measures the received channel power indicator (RCPI). RCPI is a measurement of the RF signal, which includes noise and interference. Although the measurement of the RCPI is shown as being at the antenna connector, in alternate embodiments, measurements at another point in the physical layer processing are extrapolated to represent the RCPI at the antenna connector 914. Accordingly, the RCPI, although measured by another technique, is effectively a measurement at the antenna connector.

An average noise plus interference (ANPI) value is measured by an ANPI measurement device 918 at the antenna connector 914. Although illustrated as being measured at the antenna connector, the ANPI may be measured at another point in the physical layer processing and extrapolated to represent the value at the antenna connector. The ANPI is a value representing the average noise plus interference power on the measured channel. In one embodiment, ANPI is measured during the measurement duration when NAV is equal to zero or, in other word, when the virtual carrier sense (CS) mechanism indicates an idle channel. A preferred value for ANPI is defined in dbm using the same units as for RCPI. In one embodiment, ANPI may be derived as a summary metric from the noise histogram by calculating a weighted average of the histogram bin power levels. In an exemplary embodiment, ANPI may be calculated by a weighted average for the reported RPI densities assuming noise power to be the mid range value for each of the nine defined ranges for the RPI levels, such as defined in Table 1, although other ANPI calculation techniques may be used.

TABLE 1

| RPI | RPI Level (dBm) |
|---|---|
| 0 | RPI ≤ 92 |
| 1 | −92 < RPI ≤ −87 |
| 2 | −87 < RPI ≤ −82 |
| 3 | −82 < RPI ≤ −77 |
| 4 | −77 < RPI ≤ −72 |
| 5 | −72 < RPI ≤ −67 |
| 6 | −67 < RPI ≤ −62 |
| 7 | −62 < RPI ≤ −57 |
| 8 | −57 < RPI |

In an 802.11 environment, it is difficult to derive a neutral interference power measurement, due to the CSMA/CA and time-varying interference levels that other wireless systems typically do not have. By converting the interference power histograms into a scalar value provides a more meaningful useful measure of the interference level.

Using the measured RCPI and ANPI, a received signal to noise indicator (RSNI) is measured. The RSNI value is a received signal to noise measurement for a received frame at the antenna connector 914, such as the currently in use antenna connector. This value is preferably reported in an RSNI field, such as to an access point. The RSNI is added to a beacon report, frame report and reassociation response. The RSNI is the received signal to noise plus interference ratio derived from the measured RCPI and ANPI. Preferably, the ANPI is the most recent ANPI value measured on the channel used to receive the frame; however, other techniques may be used. An exemplary embodiment of a derivation of RSNI is a ratio of the received signal power (RCPI−ANPI) over the noise plus interference power (ANPI), expressed in db, such as in half db steps. For a preferred range of −10 db to +118 db, RSNI=[(ratio in db)+10)*2]. The ratio is (RCPI−ANPI)/ANPI. This ratio is preferably defined at the medium access control (MAC) layer.

FIG. 5 illustrates one embodiment of a circuit from calculating the ratio for RSNI. A subtractor 920 subtracts the ANPI from the RCPI, producing RCPI−ANPI. This value is divided by the ANPI by a divider 922, producing the ratio for RSNI. This ratio is typically scaled to produce the RSNI value for the preferred range, such as to the preferred range of −10 dB to +118 db. Although the circuit in FIG. 5 is illustrated as being a subtractor 920 and a divider 922, other devices can be used to perform these calculations, such as a processor.

Figure 6:
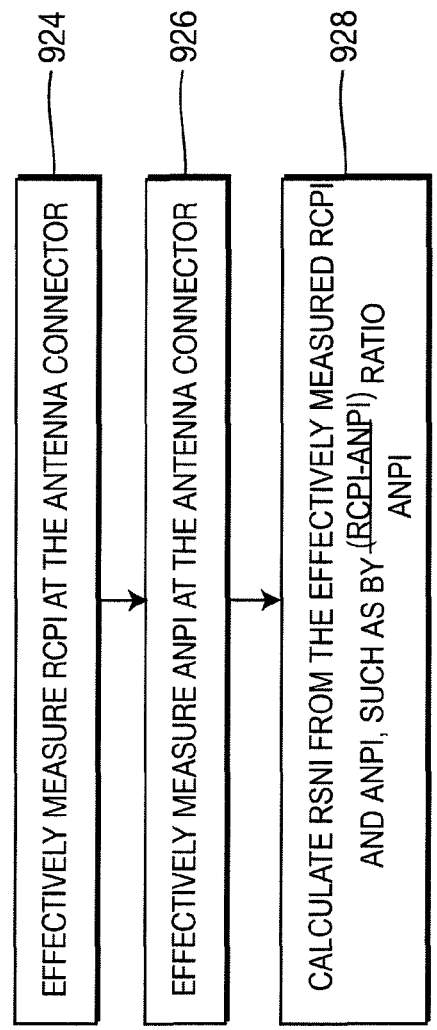
FIG. 6 is a flow diagram of RSNI calculation.

FIG. 6 is a flow diagram of RSNI calculation. In step 924, the RCPI is effectively measured so as to represent the RCPI at the antenna connector. In step 926, the ANPI is effectively measure so as to represent the ANPI at the antenna connector. In step 928, RSNI is calculated from the RCPI and ANPI.

Figure 7:
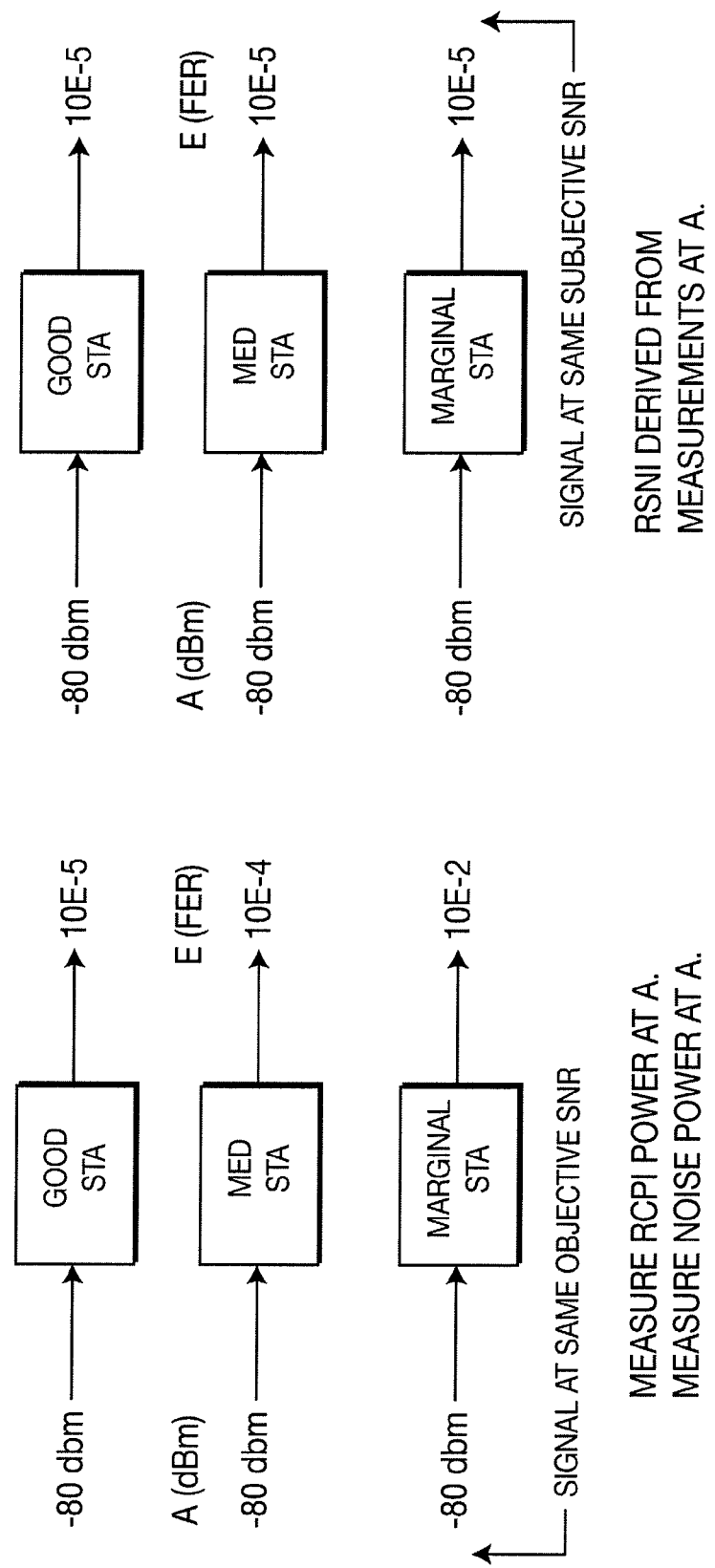
FIG. 7 is an illustration of a comparison of a RCPI measurements and the resulting forward error rate (FER).
Figure 8:
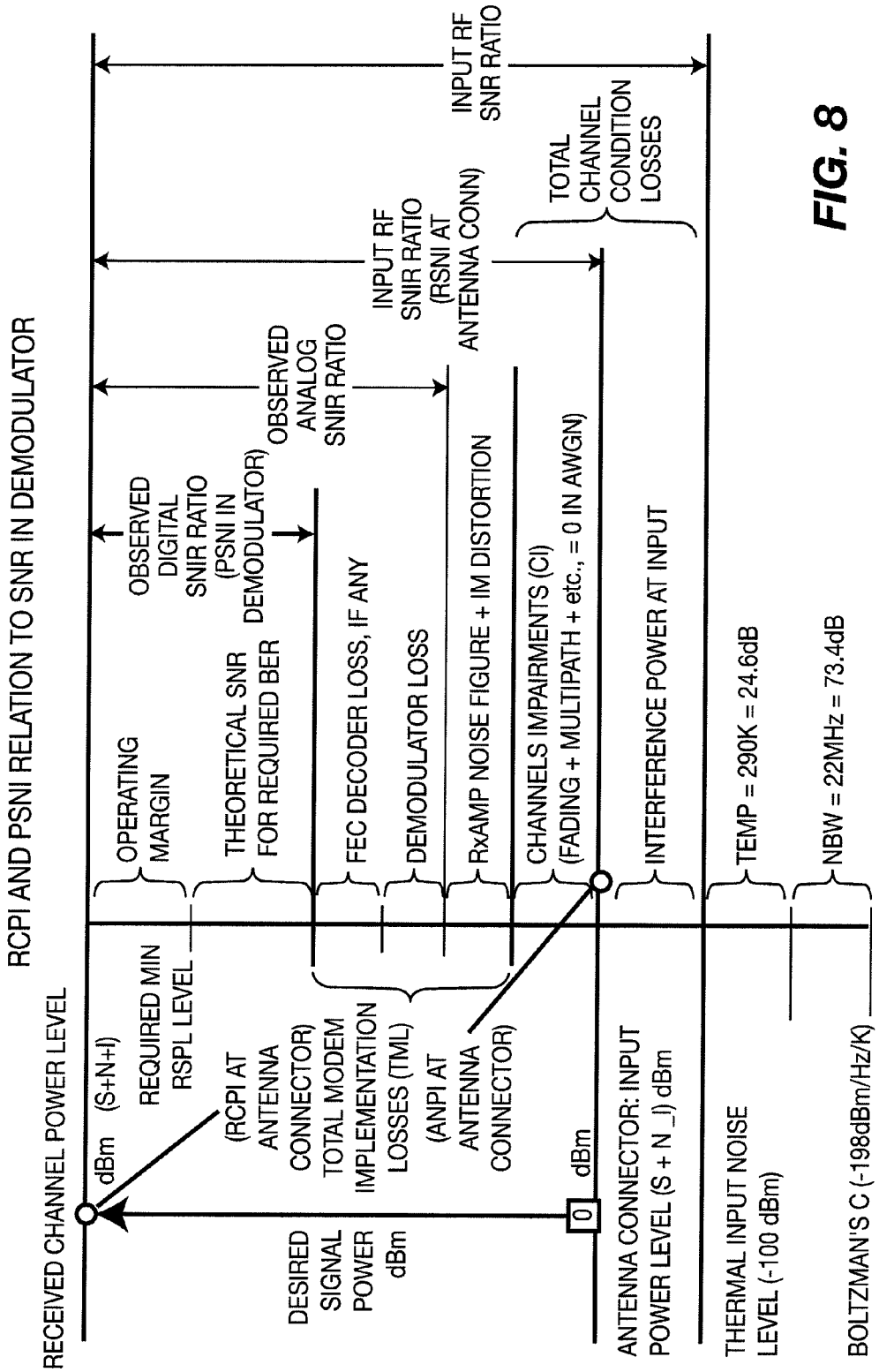
FIG. 8 is an illustration of the signal to noise ratio (SNR) of RCPI and PSNI.

In some implementations, RSNI can be used as an effective comparative tool to evaluate the delivered signal quality between stations. Because RSNI is measured at the antenna connector it provides a fair evaluation between stations. Various stations may have different RF/demodulation implementations, which can skew the results downstream. Although FER measurements at point E in FIG. 4 can be used, that value cannot be measured frame by frame. FER can only be accurately measured over 100s to 1000s of frames. Also, FERs are comparable only at the same frame size and data rate. FIG. 7 is an illustration of a comparison of a RCPI measurement at A and the resulting FER if the signal is kept to the same objective/subjective SNR for a Good, Medium and Marginal quality station. As illustrated on the left of the chart, all three stations have the same RCPI and the same objective SNR. However, the actual FERs differ greatly based on the physical layer processing quality of the station. On the right side, using the RSNI to maintain a same subjective SNR, the RCPI at A vary, but the FERs are equivalent for the various stations. Accordingly, RSNI is a tool that may be used to better allocate resources to stations of varying quality. FIG. 8 illustrates the SNR relation of RCPI and PSNI in the demodulator.

What is claimed is:

1. A method for use in a receiver for reporting a received signal to noise ratio, the method comprising:
    calculating a received signal to noise indicator (RSNI) value based on a measured received power of a channel and a measured average noise plus interference power of the channel, wherein calculating the RSNI value further comprises:
        subtracting the measured average noise plus interference power from the measured received power to determine a difference, and
        dividing the difference by the measured average noise plus interference to determine the RSNI value; and
    reporting the RSNI value to an access point.

2. The method of claim 1 wherein the RSNI value is included in a field of a beacon report.

3. The method of claim 1 wherein the RSNI value is included in a field of a frame report.

4. The method of claim 1 wherein the RSNI value is included in a field of a reassociation response.

5. The method of claim 1 wherein the received power and the average noise plus interference power are measured at an antenna connector.

6. The method of claim 1 further comprising: scaling the RSNI value for a desired range.

7. The method of claim 1 wherein the measured received power is a measurement of a radio frequency (RF) signal that includes noise and interference.

8. The method of claim 1 wherein the RSNI value is in a range of −10 db to +118 db.

9. The method of claim 1 further comprising: transmitting the RSNI value in a management frame or a control frame.

10. A receiver comprising:
    a processor configured to calculate a received signal to noise indicator (RSNI) value based on a measured received power of a channel and a measured average noise plus interference power of the channel, wherein the processor calculates the RSNI value by subtracting the measured average noise plus interference power from the measured received power to determine a difference, and dividing the difference by the measured average noise plus interference.

11. The receiver of claim 10 wherein the processor is further configured to include the RSNI value in a field of a beacon report.

12. The receiver of claim 10 wherein the processor is further configured to include the RSNI value in a field of a frame report.

13. The receiver of claim 10 wherein the processor is further configured to include the RSNI value in a field of a reassociation response.

14. The receiver of claim 10 wherein the received power and the average noise plus interference power are measured at an antenna connector.

15. The receiver of claim 10 wherein the processor is further configured to scale the RSNI value for a desired range.

16. The receiver of claim 10 wherein the measured received power is a measurement of a radio frequency (RF) signal that includes noise and interference.

17. The receiver of claim 10 wherein the receiver is a wireless transmit/receive unit (WTRU).

18. The receiver of claim 10 wherein the receiver is a base station.

* * * * *